United States Patent
Denison

(10) Patent No.: US 12,461,954 B2
(45) Date of Patent: Nov. 4, 2025

(54) METHOD OF USING ML AND AI TO GENERATE CODEX CONTENT

(71) Applicant: Sony Interactive Entertainment LLC, San Mateo, CA (US)

(72) Inventor: Charles Denison, San Mateo, CA (US)

(73) Assignee: Sony Interactive Entertainment Inc., San Mateo, CA (US)

( * ) Notice: Subject to any disclaimer, the term of this patent is extended or adjusted under 35 U.S.C. 154(b) by 309 days.

(21) Appl. No.: 18/180,780

(22) Filed: Mar. 8, 2023

(65) Prior Publication Data

US 2024/0303261 A1    Sep. 12, 2024

(51) Int. Cl.
G06F 16/334    (2025.01)
A63F 13/35     (2014.01)
G06F 16/332    (2025.01)
G06F 16/3332   (2025.01)

(52) U.S. Cl.
CPC .......... *G06F 16/3344* (2019.01); *A63F 13/35* (2014.09); *G06F 16/3334* (2019.01)

(58) Field of Classification Search
CPC ... G06F 16/3334; G06F 16/3344; A63F 13/35
See application file for complete search history.

(56) References Cited

U.S. PATENT DOCUMENTS

| | | | |
|---|---|---|---|
| 10,576,380 | B1 | 3/2020 | Beltran et al. |
| 2007/0260567 | A1 | 11/2007 | Funge et al. |
| 2008/0097948 | A1 | 4/2008 | Funge et al. |
| 2009/0054123 | A1 | 2/2009 | Mityagin et al. |
| 2009/0094535 | A1 | 4/2009 | Bromenshenkel et al. |
| 2011/0302117 | A1 | 12/2011 | Pinckney et al. |
| 2013/0143669 | A1 | 6/2013 | Muller |
| 2014/0256438 | A1 | 9/2014 | Grant et al. |
| 2015/0375101 | A1 | 12/2015 | George |
| 2016/0005270 | A1 | 1/2016 | Marr et al. |
| 2017/0021274 | A1 | 1/2017 | Vonderhaar |
| 2017/0302611 | A1 | 10/2017 | Mizuki et al. |
| 2018/0280802 | A1 | 10/2018 | Stroud |
| 2019/0143218 | A1* | 5/2019 | Sulakhe .............. A63F 13/55 463/40 |
| 2019/0272560 | A1 | 9/2019 | Shin et al. |

(Continued)

OTHER PUBLICATIONS

Zhang, DIALOGPT: Large-Scale Generative Pre-training for Conversational Response Gneration, 2019, arXiv, whole document (Year: 2019).*

(Continued)

*Primary Examiner* — Sonia L Gay
(74) *Attorney, Agent, or Firm* — Fish & Richardson P.C.

(57) ABSTRACT

A chatbot receives a player query for help and based on being trained on a wide corpus of documents including gamer comments on social media sites, returns in natural human language either spoken or written, a gameplay strategy. Accordingly, a player can input a question to a model such as chatGPT to cause the model to determine an optimum mechanic (such as a weapon) for the player's current game situation and if desired return a video clip showing the mechanic and use thereof. In training, recognized objects can be input to the chatbot with ground truth description. The chatbot can access sites such as Discord, Reddit, etc. to learn what gamers are talking about.

20 Claims, 7 Drawing Sheets

(56) References Cited

U.S. PATENT DOCUMENTS

| | | |
|---|---|---|
| 2019/0329139 A1 | 10/2019 | Di Giacomo Toledo et al. |
| 2019/0347956 A1 | 11/2019 | Daga et al. |
| 2019/0388785 A1 | 12/2019 | Kumar et al. |
| 2020/0061478 A1 | 2/2020 | Kopf |
| 2020/0122043 A1 | 4/2020 | Benedetto et al. |
| 2020/0215414 A1 | 7/2020 | Morton et al. |
| 2020/0269136 A1 | 8/2020 | Gurumurthy et al. |
| 2020/0324206 A1 | 10/2020 | Yilmazcoban et al. |
| 2020/0388178 A1 | 12/2020 | Barbuto et al. |
| 2020/0398166 A1 | 12/2020 | Kwon et al. |
| 2021/0069592 A1 | 3/2021 | Noss |
| 2021/0146250 A1* | 5/2021 | Sherwani ............ A63F 13/5375 |
| 2021/0245061 A1 | 8/2021 | Kaushik |
| 2021/0268377 A1 | 9/2021 | Hamaguchi et al. |
| 2021/0407504 A1* | 12/2021 | Colleen .................... G06N 5/02 |
| 2022/0129627 A1 | 4/2022 | Tiwari et al. |
| 2022/0207229 A1* | 6/2022 | Perkins .................. G06F 40/30 |
| 2022/0230632 A1 | 7/2022 | Maitra et al. |
| 2023/0082732 A1 | 3/2023 | Denison |

OTHER PUBLICATIONS

Britt, Continuing a community of practice beyond the death of its domain: examining the Tales of Link subreddit, 2019, Behaviour and Information Technology, whole document (Year: 2019).*

Li, Knowledge-Grounded Dialogue Generation with a Unified Knowledge Representation, 2022, arXiv, whole document (Year: 2022).*

Denison, Charles, "Using Data From a Game Metadata System to Create Actionable In-Game Decisions", related U.S. Appl. No. 17/472,650, Non-Final Office Action dated Mar. 27, 2024.

Denison, Charles, "Using Data From a Game Metadata System to Create Actionable In-Game Decisions", file history of related U.S. Appl. No. 17/472,650, filed Sep. 21, 2021.

"International Search Report and Written Opinion", dated Feb. 16, 2024, from the counterpart PCT application PCT/US23/082656.

* cited by examiner

METHOD OF USING ML AND AI TO GENERATE CODEX CONTENT

FIELD

The present application relates generally to techniques for using machine learning and/or artificial intelligence to generate codex content.

BACKGROUND

Computer game players may be unskilled or novice and thus experience frustration in playing a computer simulation such as a computer game.

SUMMARY

As understood herein, such players typically have no one to turn to for help in playing a computer game. As further understood herein, chatbots have been introduced with a deep training on a wide corpus of documents, and if the training is extended to comments of experienced users, aid may be provided quickly and effectively to the novice player.

Accordingly, a system includes at least one computer medium that is not a transitory signal and that in turn includes instructions executable by at least one processor to access at least a first machine learning (ML) model trained on social media site comments from other players to respond to a query for help from a gamer. The help can include one or more computer game strategies, at least some of which may include at least one computer game character and/or executing at least one activity and/or using at least one mechanic and/or at least one computer game location.

In examples, the first ML model includes a generative pre-trained transformer trained on unsupervised learning.

In another aspect, a method includes training a generative pre-trained transformer (GPTT) using comments on at least one computer network site. The comments concern play of at least one computer game. The method includes inputting a query from a user to the GPTT concerning play of at least one computer game, and presenting a human-perceptible advisory output by the GPTT in response to the query on at least one computer output device.

In example embodiments, the method includes providing, based on the comments, plural entry types. A first entry type includes one dimension and a second entry type includes at least two dimensions. A dimension includes a computer game mechanic, or a computer game character, or a computer game environment, or a computer game location, or a computer game activity. In these examples, the method can further include providing a respective codex entry for each respective plural entry type, and the GPTT is executed to respond to the query using at least a first one of the respective codex entries. The first one of the respective codex entries is identified based at least in part on the query.

In example implementations, the method may include presenting the human-perceptible advisory in natural human language in grammatically correct form on at least one audio speaker. In addition or alternatively, the human-perceptible advisory can be presented in natural human language in grammatically correct form on at least one video display.

In another aspect, an apparatus has at least one processor configured to input a query for computer game information to at least one generative pre-trained transformer (GPTT). The processor is configured to receive a response to the query from the GPTT, and present the response on at least one output device.

If desired, the GPTT can be trained on comments on at least one computer network site, with the comments concerning play of at least one computer game.

In some examples the processor is configured for identifying a codex to use to respond to the query. The codex is selected from the group including at least a first codex and a second codex, with the first codex comprising a first number of dimensions and the second codex comprising a second number of dimensions. A dimension includes a computer game mechanic, or a computer game character, or a computer game environment, or a computer game location, or a computer game activity.

The details of the present application, both as to its structure and operation, can be best understood in reference to the accompanying drawings, in which like reference numerals refer to like parts, and in which:

DETAILED DESCRIPTION

Figure 1:
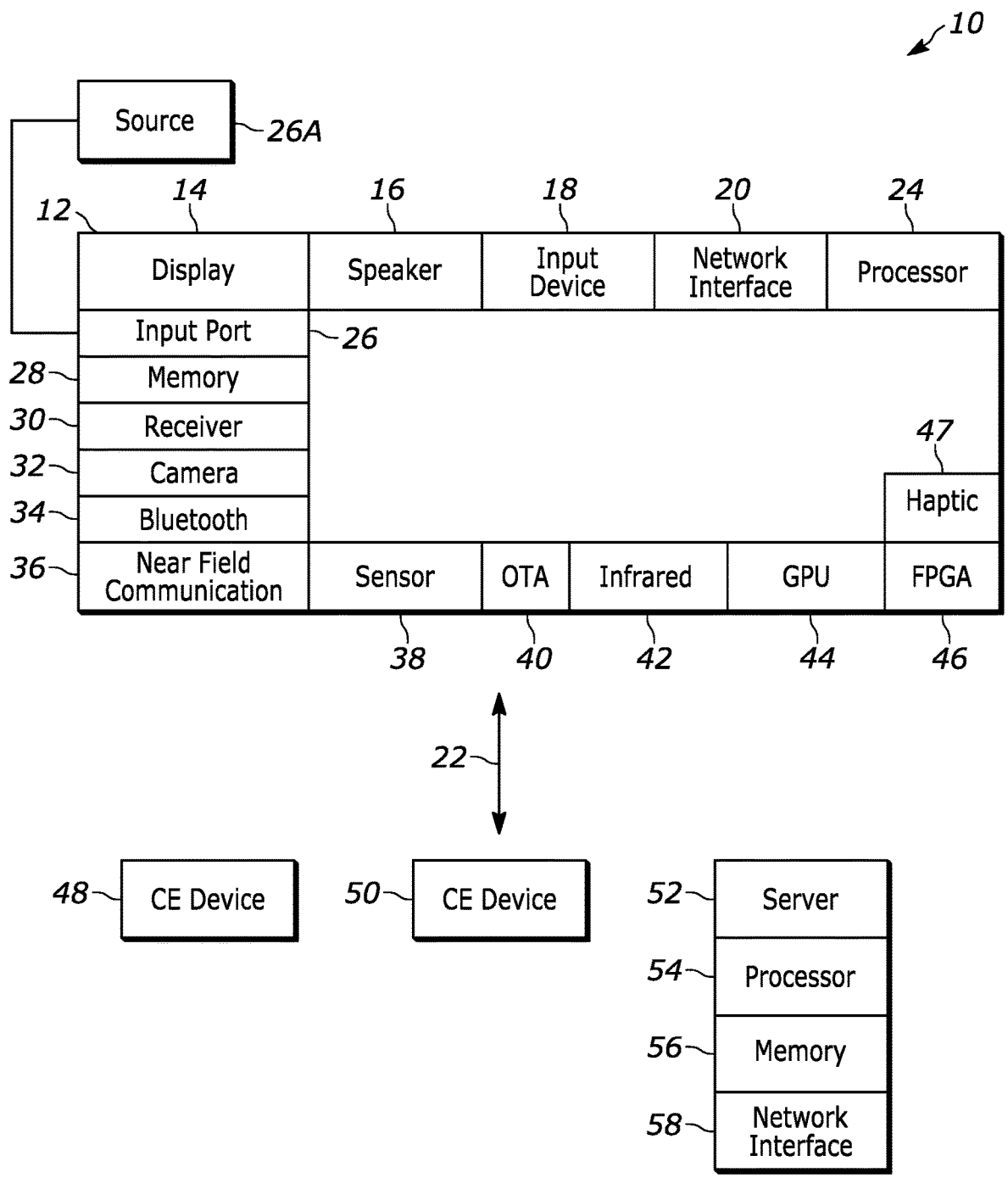
FIG. 1 is a block diagram of an example system including an example in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics generators 47 may be provided for generating tactile signals that can be sensed by a person holding or in contact with the device.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. The user interfaces (UI) described herein may be consolidated, expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. However, a preferred network contemplated herein is a generative pre-trained transformer (GPTT) that is trained using unsupervised training techniques described herein.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
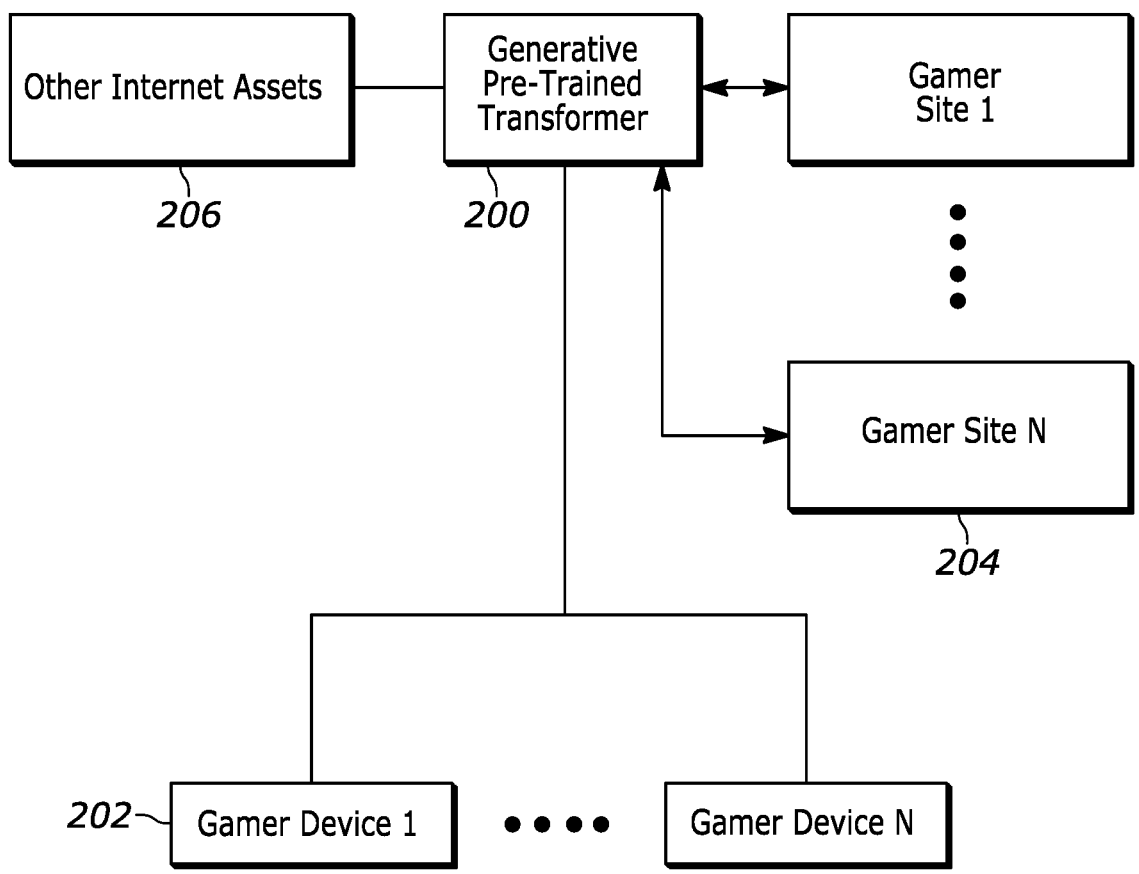
FIG. 2 illustrates a game advice system employing a generative pre-trained transformer (GPTT) consistent with present principles.

Turning to FIG. 2, in general, a generative pre-trained transformer (GPTT) 200 such as may be referred to as a "chatbot" receives queries for help from computer game player devices 202 and based on being trained on a wide corpus of documents including gamer comments on social media sites 204 as well as other Internet assets 206, returns in natural human language either spoken or written, a gameplay strategy. Accordingly, a player can input a question to a model such as chatGPT to cause the model to determine an optimum mechanic (such as a weapon or a vehicle or other implement a computer character might use) for the player's current game situation and if desired return a video clip showing the mechanic and use thereof. In training, recognized objects can be input to the chatbot with ground truth description. The chatbot can access computer gamer sites such as Discord, Reddit, etc. to learn what gamers are talking about.

The advisories returned from the GPTT 200 may include, in addition to those examples described elsewhere herein, an indication of what the player currently is doing in terms of character employed, mechanic employed, and location in the game of the activity. The advisories also may include recommendations in terms of what successful gamers are doing playing the same game but using perhaps different characters in different game locations with different mechanics than currently being employed by the player receiving the advice. The player receiving the advice may thus be presented with recommendations for changing one or more of the object types described herein, e.g., to change play using a different game character or different game mechanic or conduct a different activity in a different game location.

Figure 3:
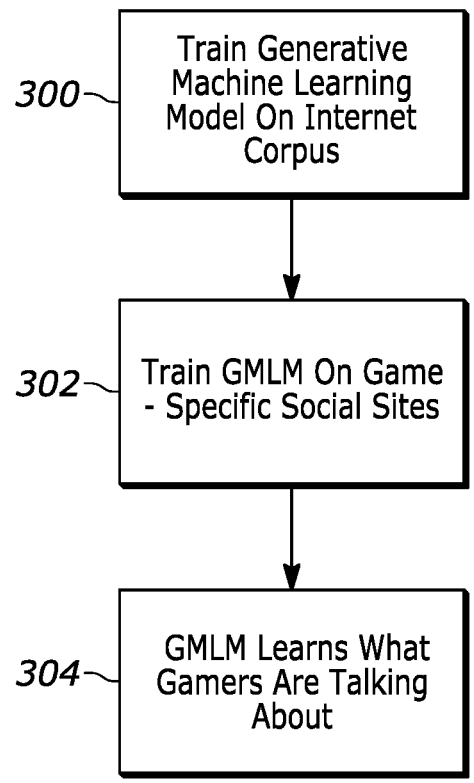
FIG. 3 illustrates example training logic in example flow chart format.

Commencing at block 300 of FIG. 3, if desired a generative machine learning model (GMLM) such as the GPTT 200 shown in FIG. 2 may be trained to learn natural human langue on an Internet corpus of documents. Also, according to present principles and as indicated at block 302 in FIG. 3, the GMLM can be trained on computer game-specific network sites to learn what comments are being posted concerning which games by computer game players, so that at learning block 304 the GMLM can learn what computer gamers ate discussing.

Figure 4:
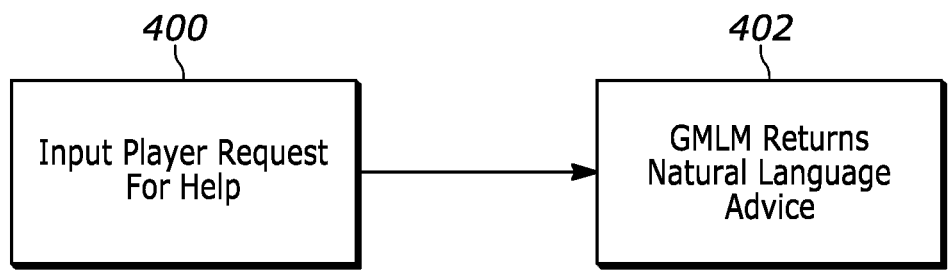
FIG. 4 illustrates example use logic in example flow chart format.

With this training, at block 400 in FIG. 4 player requests for help in playing computer games may be input the GMLM trained in FIG. 3. Based on the requests the GMLM returns advisories in natural language (and in some case video as described herein) to the requesting players at block 402.

Figure 5:
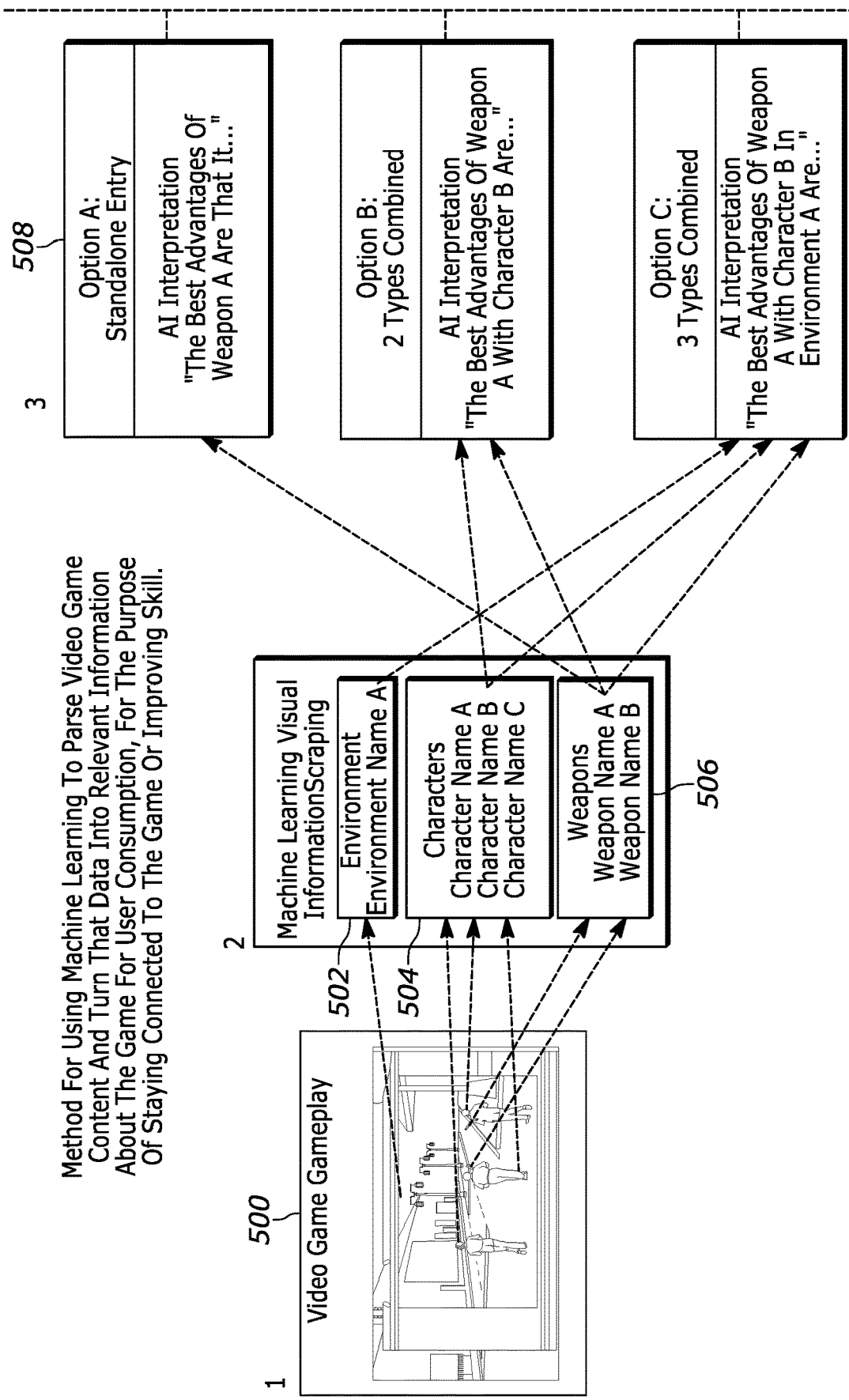
FIG. 5 illustrates an example specific environment using unsupervised training to generate multi-type codexes for gamer response.
Figure 5:
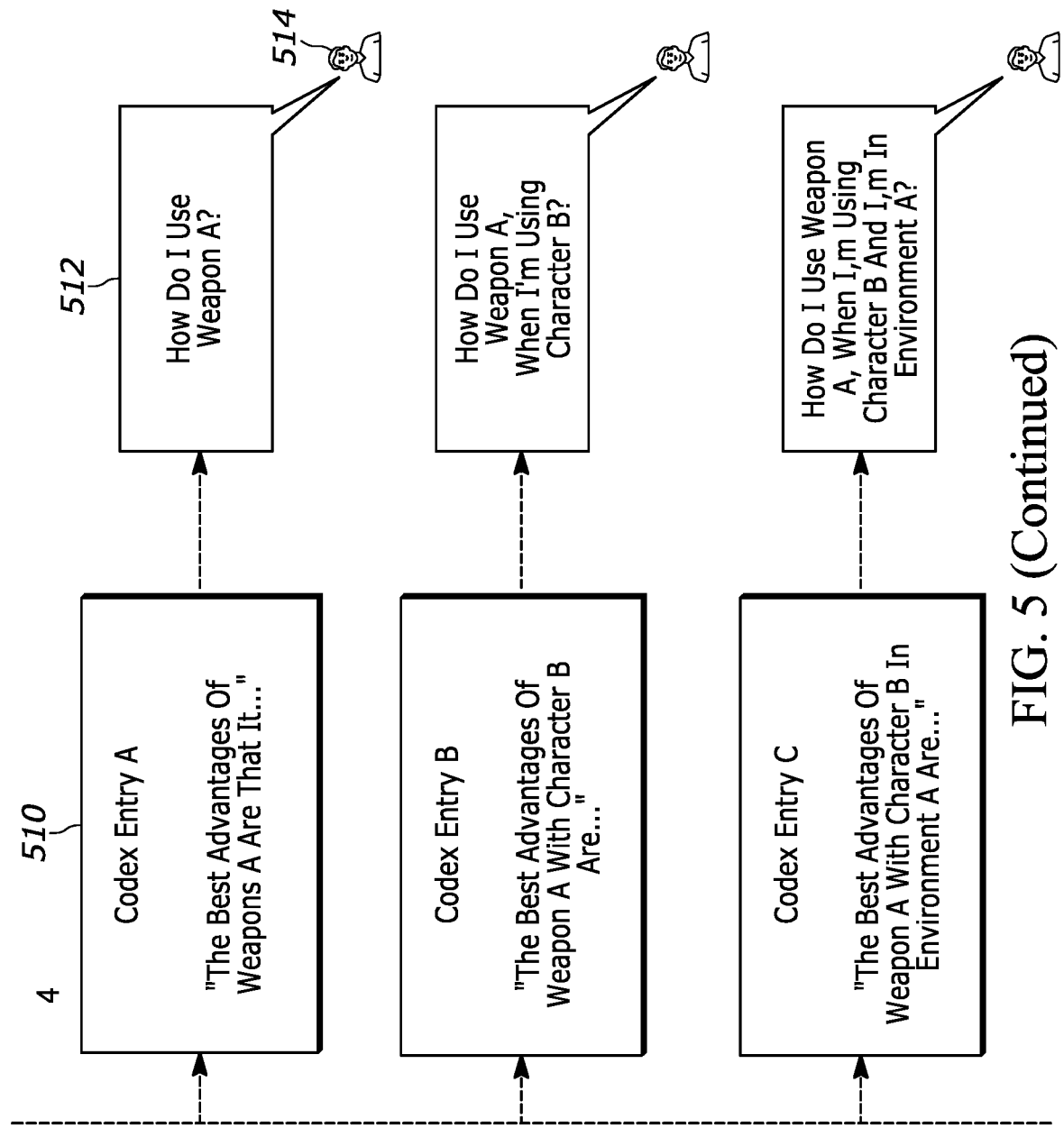

FIG. 5 provides further illustration in which object recognition is used on computer video game play scenes 500 to identify the names of environments 502, characters 504, and mechanics 506 in the video game play. This may be done by taking video images of computer displays presenting the game play scenes and using machine vision to identify the content thereof, and/or by feeding video game metadata into an analysis engine.

Based on the "scraping" of names described above, plural entry types 508 may be generated. In addition or alternatively, the entry types 508 may be generated based on analyzing the gamer comments described previously.

A first entry type may include only a single dimension while a second entry type may include at least two dimensions. A dimension can include a computer game mechanic, or a computer game character, or a computer game environment, or a computer game location, or a computer game activity. Thus, for example, the top entry type 508 in FIG. 5 contains only a single entry type related to the advantages of a mechanic, in the example shown, a particular weapon. The middle entry type 508 in FIG. 5 includes two dimensions, in the example shown, both a particular weapon and a particular related game character, while the bottom entry type in FIG. 5 includes three dimensions, namely, a particular weapon, a particular related game character, and a particular environment for the character wielding the weapon.

Based on each entry type, a respective codex 510 is generated for each respective plural entry type. The GMLM discussed above can respond to a query 512 from a gamer 514 using at least a first one of the respective codex entries as shown. The particular codex selected is based on the grammar and syntax of the query, which may be types or spoken in natural language form by the user and input to the GMLM. In each example shown, from top to bottom a query implicating one, two, and three dimensions, respectively is input to the GMLM, which accesses the appropriate codex 510 to return a response.

Figure 6:
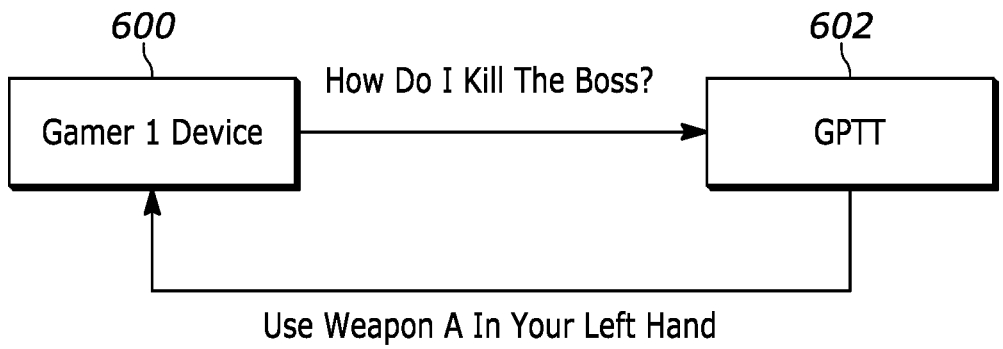
FIG. 6 illustrates a first query-response using a single type of response codex.
Figure 7:
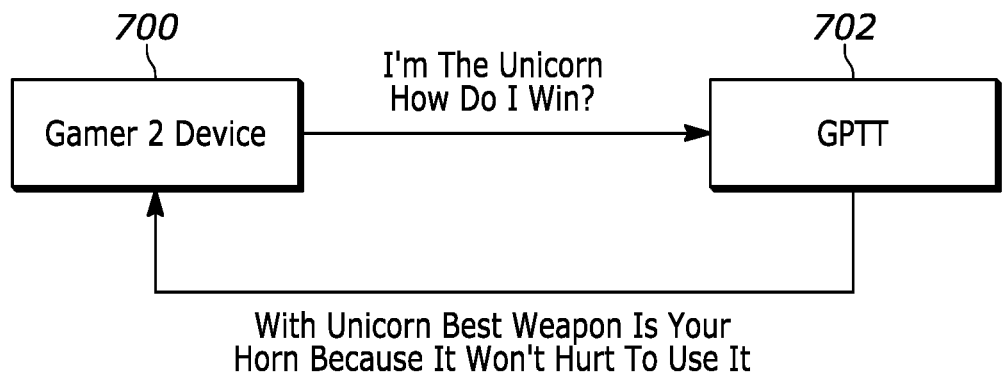
FIG. 7 illustrates a second query-response using a dual type of response codex.
Figure 8:
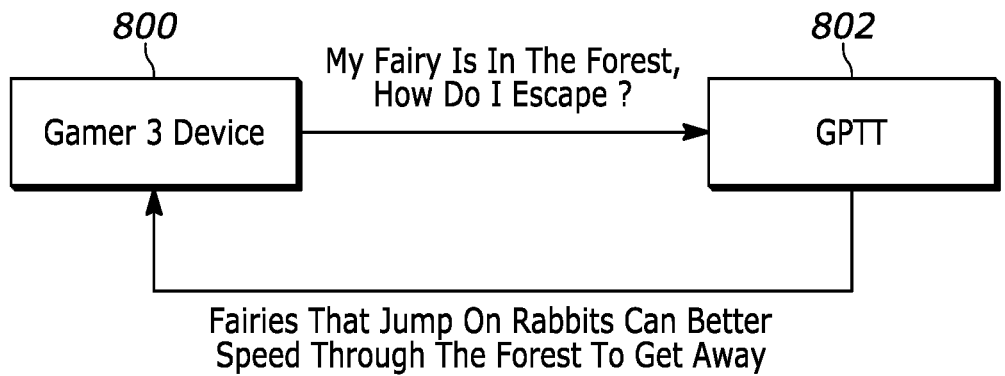
FIG. 8 illustrates a third query-response using a tri-type of response codex.

FIGS. 6-8 provide further examples. In FIG. 6, a query is received from a gamer device 600 such as a computer game console or controller or smart phone asking about how to kill a "boss" computer game character. The query is processed by a GMLM 602 such as the GPTT described herein which returns an audible or visual response to the effect that a particular weapon should be used by the player's character in the left hand of the character. The response can be played on a speaker or presented as text on a computer display. The response typically is grammatically correct natural human language advice.

In FIG. 7, a query is received from a gamer device 700 such as a computer game console or controller or smart phone asking about how to win a computer game while playing in the guise of a player character "unicorn". The query is processed by a GMLM 702 such as the GPTT described herein which returns an audible or visual response to the effect that the character should be caused to use its horn, along with a rationale for why this is the best tactic for the situation. The response can be played on a speaker or presented as text on a computer display. The response typically is grammatically correct natural human language advice.

In FIG. 8, a query is received from a gamer device 800 such as a computer game console or controller or smart phone asking about how to get a player character "fairy" to escape from a particular location, in the example shown, a forest. The query is processed by a GMLM 802 such as the GPTT described herein which returns an audible or visual response to the effect that a good strategy is for fairies to jump on rabbits which are better at maintaining speed through the implicated environment. The response can be played on a speaker or presented as text on a computer display. The response typically is grammatically correct natural human language advice.

Figure 9:
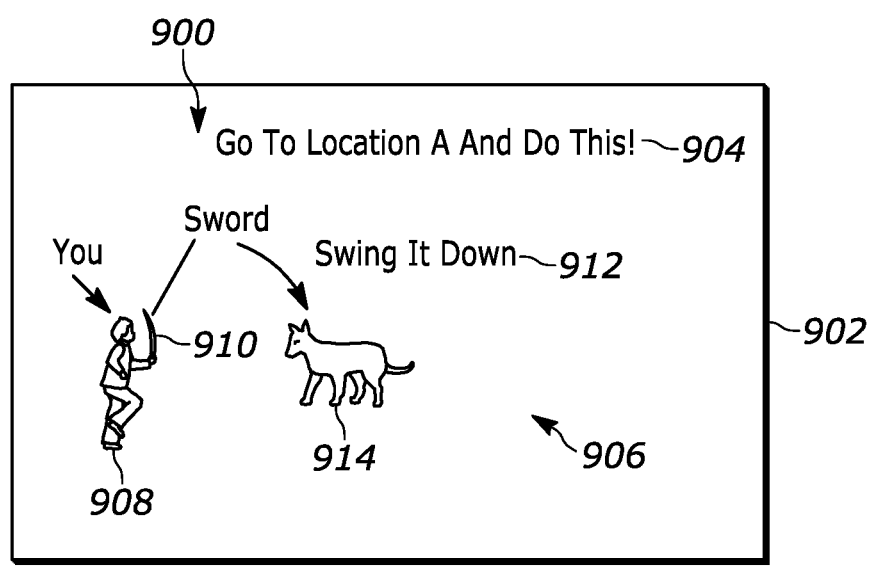
FIG. 9 illustrates a video response from a GPTT

FIG. 9 illustrates that in addition to or alternatively to natural language advisories in response to gamer queries, a video advisory 900 can be created and presented on any display 902 described herein. The video advisory may be created by a ML model trained to convert natural language phrases to video representations of objects recognized using word recognition in the phrases. In the example shown, the user is advised using natural language 904 to proceed to a particular computer game location and perform the task depicted in a video representation 906. In this example, the video representation 906 shows a player character 908 holding a weapon 910 in its left hand along with a text advisory 912 to swing the weapon 910 down onto the unsuspecting head of a computer game character 914.

While the particular embodiments are herein shown and described in detail, it is to be understood that the subject matter which is encompassed by the present invention is limited only by the claims.

What is claimed is:

1. A system comprising:
   at least one computer medium that is not a transitory signal and that comprises instructions that when executed by at least one processor cause the system to perform operations comprising:
   accessing at least a first machine learning (ML) model trained on social media site comments from other players to respond to a query for help from a gamer;
   receiving a query from a gamer playing a video game;
   detecting environment, a character, or mechanics of a current portion of the video game played by the gamer;
   generating a codex based on the detected environment, character, or mechanics;
   responding to the query using the generated codex accessed by the first ML model and by returning at least one advisory comprising one or more computer game strategies, at least some of which computer game strategies comprise at least one of: a computer game character, executing at least one activity, use of at least one mechanic in at least one computer game location; and
   presenting the advisory on at least one computer display.

2. The system of claim 1, comprising the at least one processor.

3. The system of claim 1, wherein the advisory regards at least one of a computer game character, a mechanic, a location, or an activity.

4. The system of claim 1, wherein the first ML model comprises a generative pre-trained transformer trained using unsupervised learning.

5. A method comprising:
   inputting a query from a user playing a video game to a generative pre-trained transformer (GPTT) trained using comments on at least one computer network site, the comments concerning play of at least one computer game, wherein the query concerns play of the video game;
   detecting environment, a character, or mechanics of a current portion of the video game played by the user;
   generating a codex based on the detected environment, character, or mechanics; and
   presenting, using the generated codex, a human-perceptible advisory output by the GPTT in response to the query on at least one computer output device.

6. The method of claim 5, comprising:
   providing, based on the comments, plural entry types, a first entry type comprising one dimension and a second entry type comprising at least two dimensions, a dimension comprising a computer game mechanic, or a computer game character, or a computer game environment, or a computer game location, or a computer game activity.

7. The method of claim 6, comprising generating the codex for the plural entry types.

8. The method of claim 7, comprising executing the GPTT to respond to the query using at least a first portion of the generated codex.

9. The method of claim 8, wherein the first portion of the generated codex is identified based at least in part on the query.

10. The method of claim 5, comprising presenting the human-perceptible advisory in natural human language on at least one of an audio speaker or video display.

11. An apparatus, comprising:
at least one processor configured to:
input a query for computer game information of a video game played by a user to at least one generative pre-trained transformer (GPTT);
detect environment, a character, or mechanics of a current portion of the video game played by the user;
generating a codex based on the detected environment, character, or mechanics;
receive a response to the query from the GPTT operating using the generated codex; and
present the response on at least one output device.

12. The apparatus of claim 11, wherein the GPTT is trained on comments from at least one computer network site, the comments concerning play of at least one computer game.

13. The apparatus of claim 11, wherein the processor is configured for presenting the response in natural human language on at least one audio speaker.

14. The apparatus of claim 11, wherein the processor is configured for presenting the response in natural human language on at least one computer display.

15. The apparatus of claim 11, wherein generating the codex based on the detected environment, character, or mechanics comprises identifying a codex selected from a group comprising at least a first codex and a second codex, the first codex comprising a first number of dimensions and the second codex comprising a second number of dimensions.

16. The apparatus of claim 15, wherein a dimension comprises a computer game mechanic, a computer game character, a computer game environment, a computer game location, or a computer game activity.

17. The system of claim 1, wherein detecting the environment, the character, or the mechanics of the current portion of the video game played by the gamer comprises:
performing, using machine vision, object recognition on computer video game play scenes of the current portion of the video game played by the gamer.

18. The system of claim 17, wherein the operations comprise:
generating plural entry types based on (i) performing the object recognition on the computer video game play scenes of the current portion of the video game played by the gamer and (ii) the social media site comments from other players.

19. The system of claim 1, wherein detecting the environment, the character, or the mechanics of the current portion of the video game played by the gamer comprises:
parsing metadata of computer video game play scenes of the current portion of the video game played by the gamer.

20. The system of claim 1, wherein generating the codex based on the detected environment, character, or mechanics comprises: generating the codex based on (i) the detected environment, character, or mechanics and (ii) a dimensionality of the received query from the gamer playing the video game.

* * * * *